United States Patent [19]
Wysong et al.

[11] Patent Number: 5,181,804
[45] Date of Patent: Jan. 26, 1993

[54] APPARATUS FOR CONVEYING AND DISCHARGING BULK MATERIALS

[75] Inventors: Douglas E. Wysong, Middletown; Joseph A. Bedel, Cincinnati, both of Ohio

[73] Assignee: Finn Corporation, Fairfield, Ohio

[21] Appl. No.: 800,167

[22] Filed: Nov. 27, 1991

[51] Int. Cl.⁵ .............................. B65G 53/08
[52] U.S. Cl. .............................. 406/67; 406/56
[58] Field of Search .................... 406/56, 67

[56] References Cited

U.S. PATENT DOCUMENTS

| | | | |
|---|---|---|---|
| 476,608 | 6/1892 | Calkins | 406/56 X |
| 2,890,079 | 6/1959 | Stumpf | 406/67 |
| 3,291,536 | 12/1966 | Smoot | 406/67 X |
| 4,363,571 | 12/1982 | Jackson et al. | 406/56 |

FOREIGN PATENT DOCUMENTS

| | | | |
|---|---|---|---|
| 1121544 | 1/1962 | Fed. Rep. of Germany | 406/67 |
| 601814 | 2/1960 | Italy | 406/56 |
| 545549 | 2/1977 | U.S.S.R. | 406/56 |
| 2038751 | 7/1980 | United Kingdom | 406/67 |

Primary Examiner—Charles A. Marmor
Assistant Examiner—Gary C. Hoge
Attorney, Agent, or Firm—Lynda E. Roesch

[57] ABSTRACT

An apparatus and method for conveying and discharging bulk material including a material feed hopper, a screw conveyor, a transition area and a rotary air valve. The feed hopper is divided by a diverter which distributes feed material into the two ends of a trough having a converging screw conveyor. The converging screw conveyor distributes feed material into a transitional holding area for feeding into a rotary air valve. The rotary air valve has a helical vane design and is equipped with at least one cutting knife to control the amount of bulk material distributed in the pockets between the vanes. A blower provides pressurized air flow into and through the rotary air valve. The pressurized air carries the bulk material from the rotary valve through a conduit to discharge the bulk material at a remote distance.

6 Claims, 4 Drawing Sheets

APPARATUS FOR CONVEYING AND DISCHARGING BULK MATERIALS

BACKGROUND OF THE INVENTION

1. Field of the Invention

This invention relates to a device for conveying and discharging bulk material such as bark mulch or any granular or pulverized material.

2. State of the Art

There are a number of conveying devices suitable for granular or pulverized material which utilize screw conveyors and rotary valves. None, however, are particularly suited for conveying and discharging bark mulch. Bark mulch is defined as a mixture of organic and/or inorganic materials usually comprised largely of plant and wood residues, which is generally composted and processed and is used mostly in the agricultural industry as a soil amendment, a ground cover for erosion and weed control, or for decorative purposes in landscaping. The known designs are all subject to jamming due to the build-up of bark mulch which tends to clump together and move as a large mass, instead of being easily shearable and moving as individual particles.

"Bulk Feed Body" is disclosed in Hoffstetter, U.S. Pat. No. 2,939,592, in which a screw conveyor feeds an inlet to a rotary valve. This device is primarily designed for grain or dry loose material. The apparatus utilizes a single screw conveyor which would move material such as bark mulch, but would result in compartmental bridging. The consequent build-up of the bulk material could rupture the end wall. Wolford, U.S. Pat. No. 3,443,763, also discloses a bulk feed apparatus in which a screw conveyor feeds an inlet to a rotary dispensing head. Likewise, the Wolford apparatus discloses a single screw conveyor used for displacing grain, salt and other free-flowing material. Similar problems in terms of build-up of material exist with this apparatus when utilized for moving materials such as bark mulch. The Wolford apparatus employs a material handling dispensing head and basically slings or throws the feed material by centrifugal force.

Temple, U.S. Pat. No. 2,757,049, for a "Flour Valve." It uses a helix in a rotation away from the helix angle in order to vent air into the feed. This system is also particularly adapted to freeflowing feed material.

Hickey, et al., U.S. Pat. No. 3,263,592, discloses an "Apparatus for Processing Fat-Containing Solids" which is not adaptable to discharging bulk materials. The Hickey machine discloses a single screw conveyor having the disadvantages discussed above.

"An Unloading System for Bulk Material Bins," Nadolske, U.S. Pat. No. 3,270,921, uses a moving air lock for displacing grains. The Nadolske apparatus includes a moving air lock with rubber tipped vanes. The apparatus disclosed in Nadolske would be prone to continuous jamming if utilized to displace bark mulch, as the long fibrous nature of the material tends to fold the airlock seals back and material bridges in the hoppers.

Burinsky, U.S. Pat. No. 3,314,596, for a "Forage Blower" discloses the use of an angled knife in conjunction with straight vanes on a fan along with a single screw conveyor. The knife is positioned on the outlet side of the fan. The disadvantages of the single screw conveyor have been discussed previously. The Burinsky apparatus would not be capable of conveying material because this type of fan will not build air pressure if a large portion of material plugs the fan inlet or outlet. This is a high speed application as opposed to a low speed heavy torque apparatus as disclosed in the present invention. Furthermore, the fan utilized in this apparatus is extremely noisy, and when handling bark mulch, a very high strength fan would be required.

Vinyard, U.S. Pat. No. 3,348,652, discloses the use of a converging screw conveyor system, but unlike the present invention, it gathers randomly spaced debris with the conveyor and seldom, if ever, running at full capacity due to the design of the conveyor housing.

Johnson, U.S. Pat. No. 3,926,377, is an apparatus for moving granulated and pulverized material. The feed drops through an air lock. The apparatus is not suited for conveying fibrous materials. Fibrous materials tend to jam the airlock and plug the distributor disks.

Boyhont, U.S. Pat. NO. 4,109,966, discloses a pneumatic conveying device which utilizes a single screw press to dewater pulp type material. Stringy material such as bark mulch would plug up the inlet and outlet of the chamber of the Boyhont device.

Oury, U.S. Pat. No. 4,117,920, discloses a converging single pitch screw conveyor. The "Auger Hopper" disclosed in Oury has no means to meter material other than the size of the outlet opening in the trough.

Machnee, U.S. Pat. No. 4,432,675, for a "Pneumatic Feed Control for Pneumatic Seeder and the Like" shows an air seeder which is not suited for displacing bark mulch because the shear points would tend to jam up. Small orifices would plug and this type of fan, like that used in the Burinsky devise, would lose air pressure.

Hellerman, U.S. Pat. No. 4,486,126, a "Pneumatic Conveyor for Silage and Haylage" is a variation of the Burinsky patent which discloses rotary cutting knives which counter-rotate to the airlock vanes. The knifes move the material back into the gravity feed system and act as wipers rather than shear points. Tenacious fibers as in bark mulch would jam, require high power and large vanes to handle induced stresses.

Schumacher, U.S. Pat. No. 4,617,177, shows a screw to dewater raw materials and is not at all related to the present application. A German patent, Patent No. 374033, also shows the state of the art of devices used for conveying materials.

SUMMARY OF THE INVENTION

An object of the present invention is to provide an apparatus for conveying and discharging granular or pulverized material, especially bark mulch.

Another object of this invention is to provide a novel conveying system which readily accommodates the moisture content and texture of bark mulch without jamming.

Another object of this invention is to provide a method for displacing feed material which is difficult to handle over long distances.

Still another object of this invention is to provide an apparatus in which the feed material meters itself into a rotary air valve.

Yet a further object of this invention is to provide a device for discharging bulk material which utilizes an air valve with a bi-rotational rotor to preclude jamming.

The objects of this invention are achieved by a device which includes a feed hopper assembly having a diverter which displaces feed material to the ends of the hopper. A converging screw conveyor transports and meters feed material to an outlet where feed material is dropped or forced into a transition area. From the transition area, feed material enters the rotary air valve. The rotary air valve is equipped with helical vanes and cutting knives in order to ensure control of the proper amount of the feed material into a conduit through which pressurized air flows in order to displace the bulk material.

BRIEF DESCRIPTION OF THE DRAWINGS

The invention will be described in connection with the annexed drawings wherein.

DESCRIPTION OF THE PREFERRED EMBODIMENT

Figure 1:
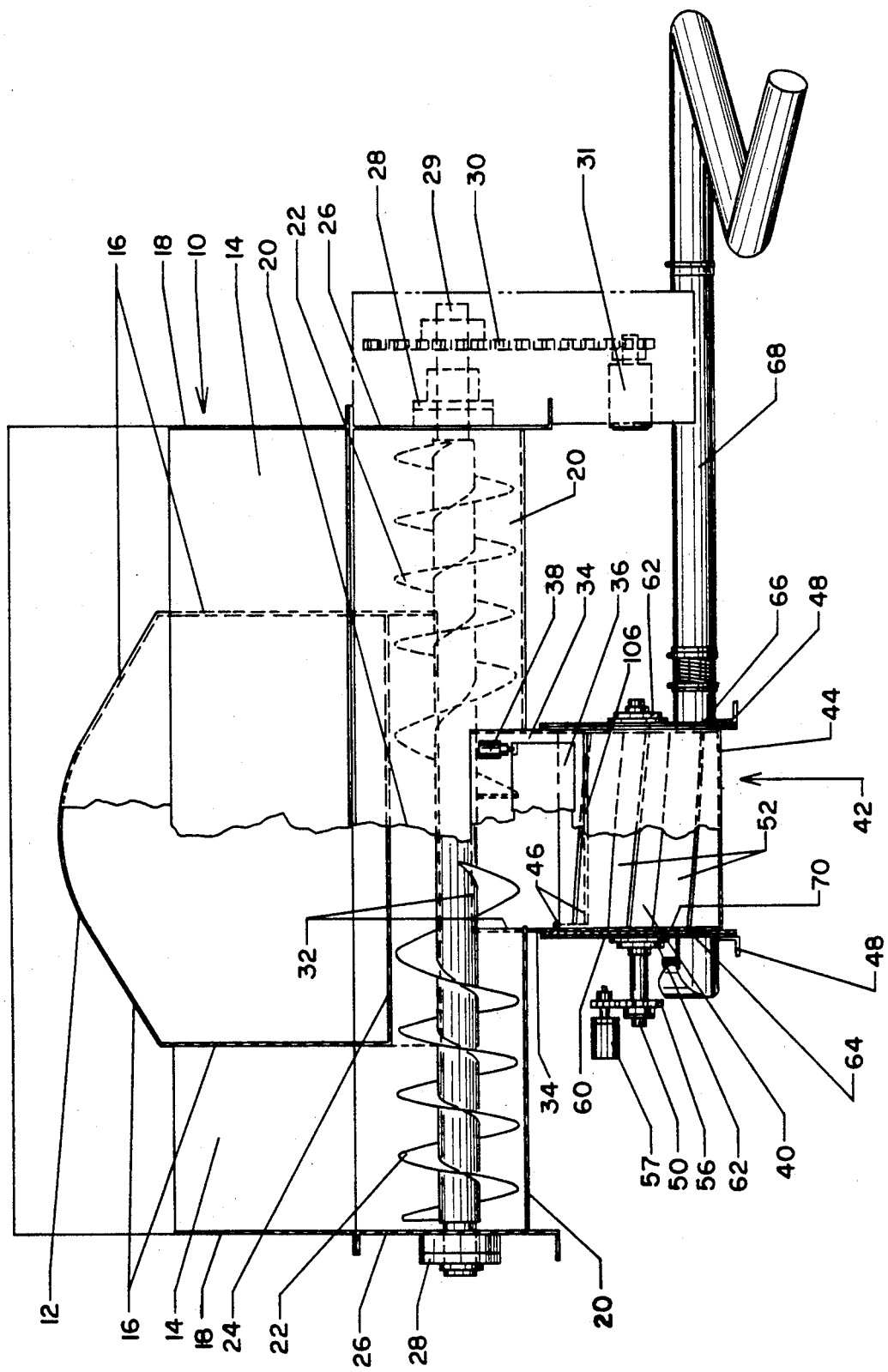
FIG. 1 is a plan view, partly in section, showing the conveying and discharging device of the present invention.
Figure 2:
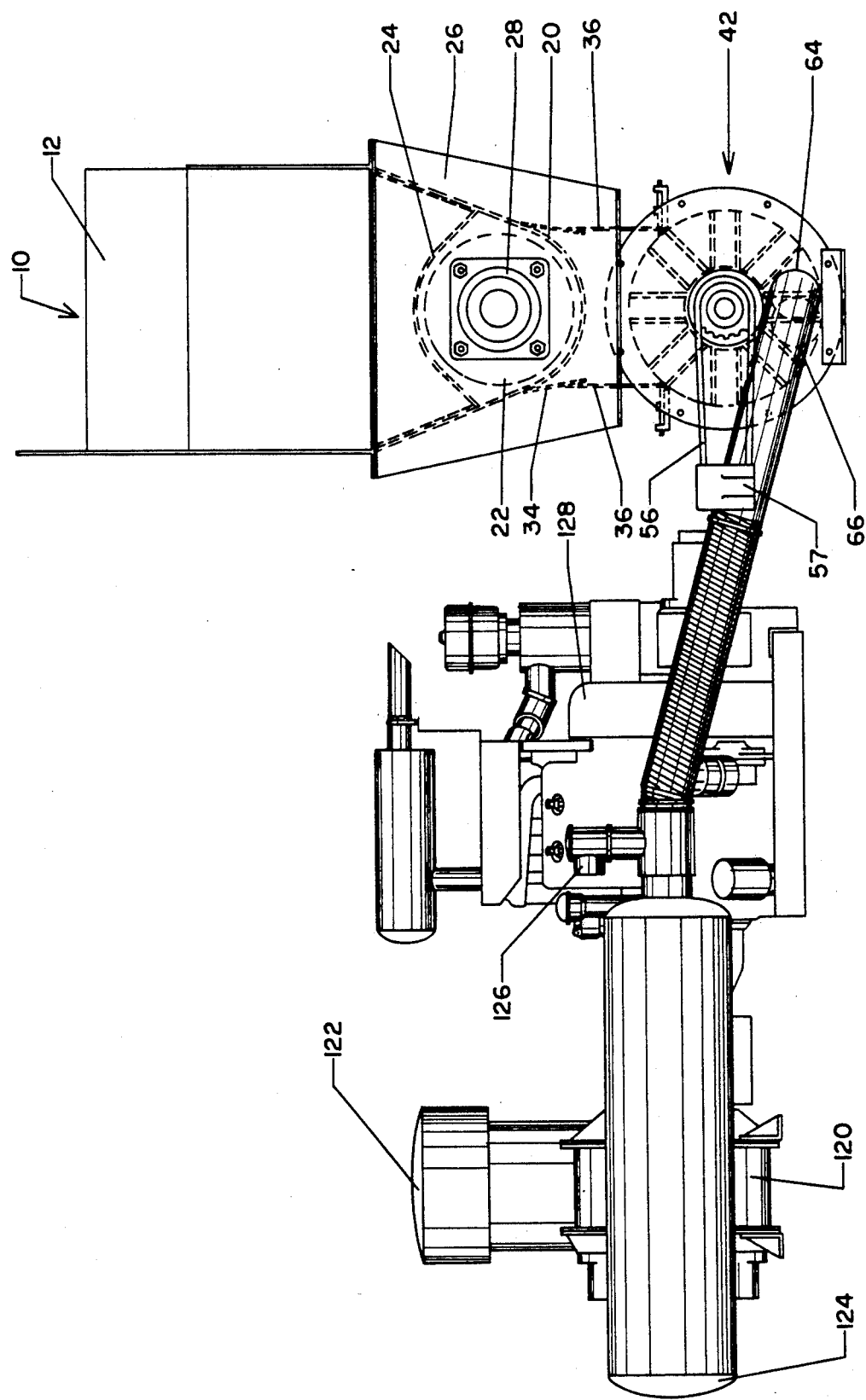
FIG. 2 is a side plan view showing the present invention.
Figure 3:
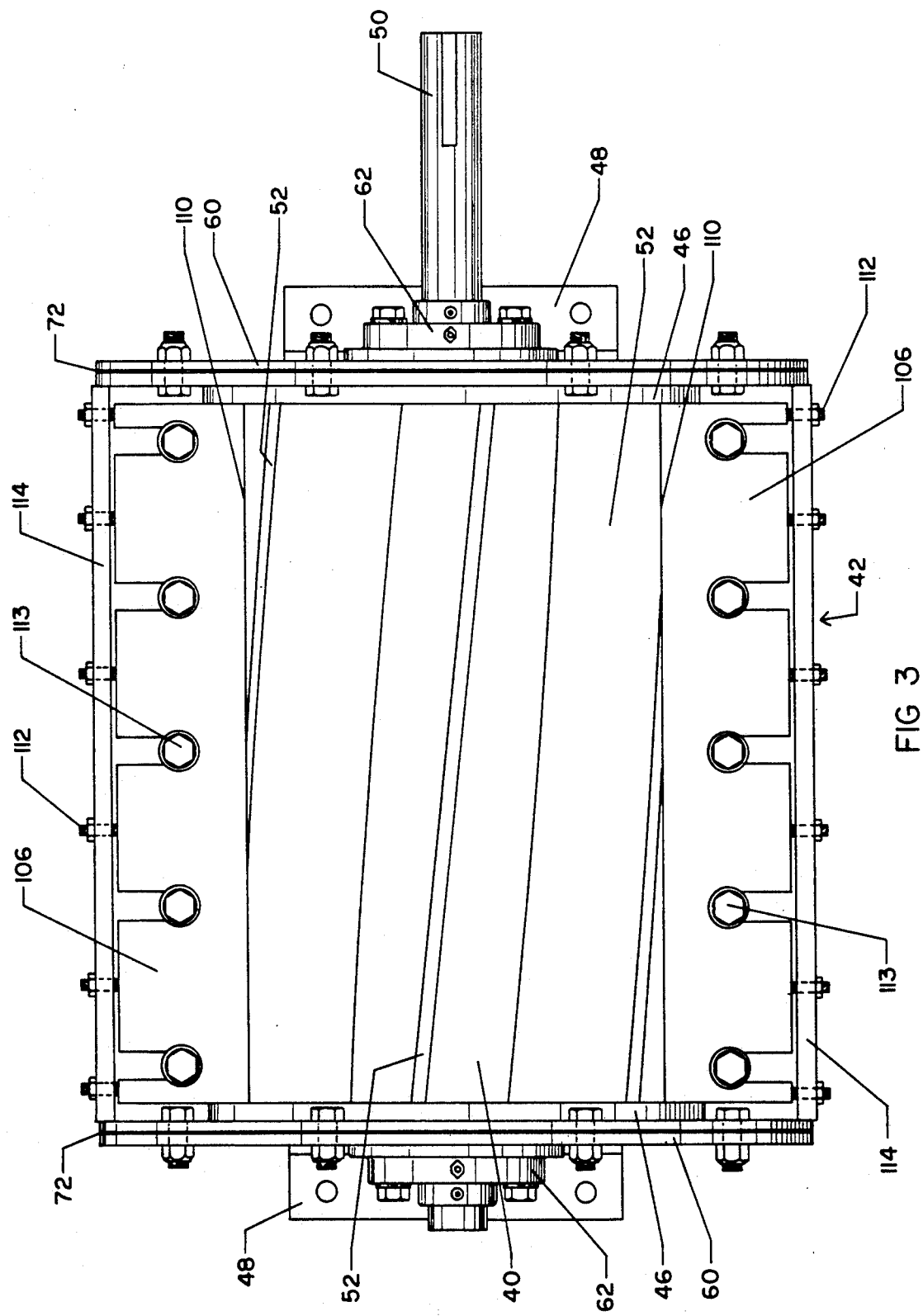
FIG. 3 is a plan view of the rotary air valve of the present invention.
Figure 4:
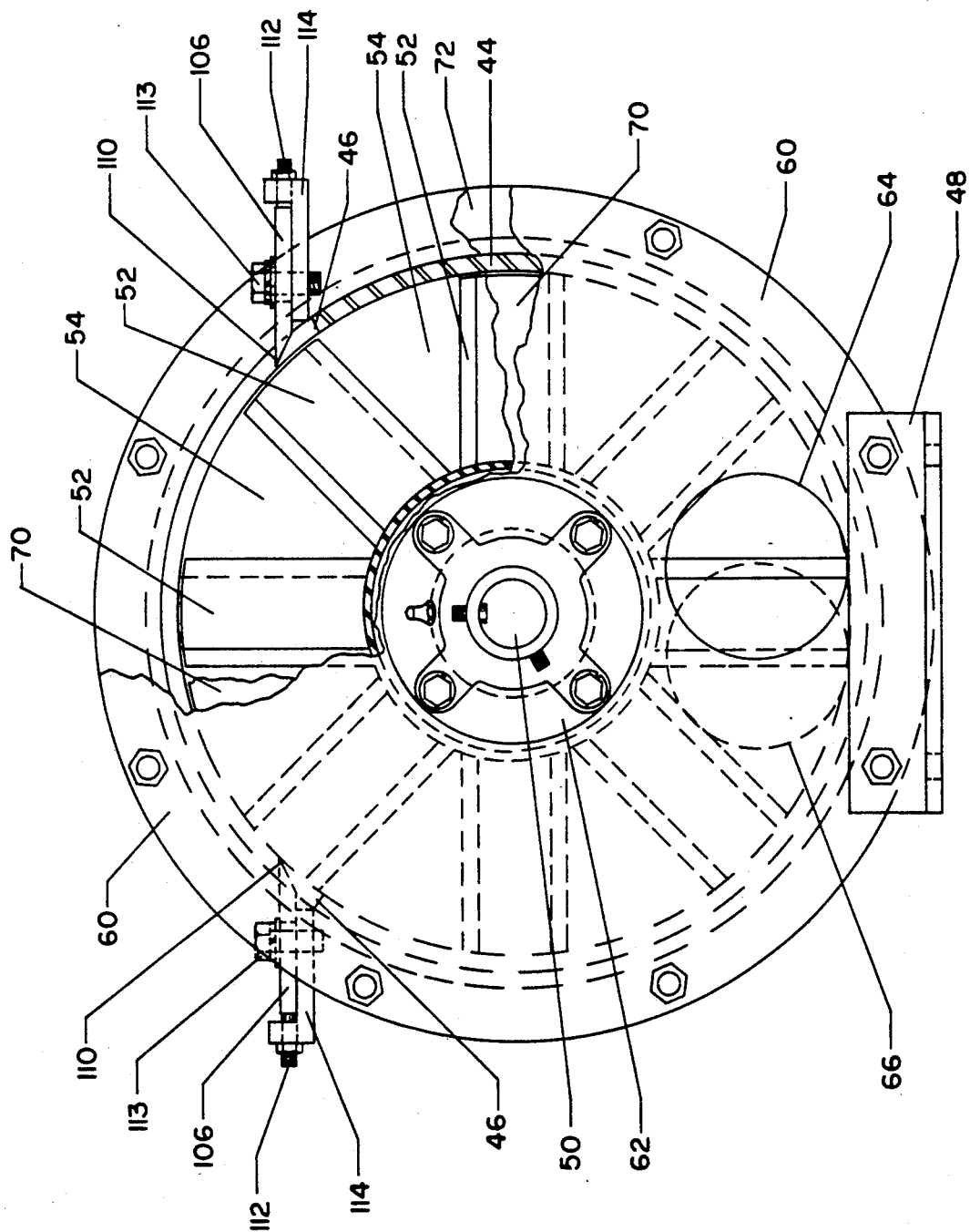
FIG. 4 is a side elevational view, partly in section, of the rotary air valve.

The device of the present invention comprises a hopper assembly (10) of basically rectangular cross section in length and square cross section in width with an open top and bottom. Placed midway across the length of the hopper (10) is a diverter (12) typically wedge-shaped that divides the hopper openings into two halves (14). The diverter (12) is positioned at or near the center of the hopper length. The sides (16) of the diverter (12) are usually positioned off parallel and sloping in such manner that feed material is encouraged towards the end wall (18) of the hopper (10) and downwards to the screw conveyor (22) without bridging. The rectangular section forming the hopper front may be hinged at the bottom to allow it to fold down for easy loading access.

Mounted directly onto and generally below the hopper assembly is a flared trough (20) with a concave, semi-circular bottom containing a converging screw conveyor (22). The longitudinal axes of the trough (20), the screw (22), and the hopper assembly (10) are all parallel. The conveyor trough (20) is open on the top toward the ends with the openings being the ends of the hopper (18) and the sloped sides (16) of the diverter (12). Under the diverter (12) is a shroud (24) which transforms the open trough (20) into a conduit of essentially circular shape.

The screw (22), located concentrically in the concave arc of the trough (20), is supported and rotates on bearings (28) mounted on trough endplates (26) which coincide with the hopper ends (18) and is driven by a motor (31) connected to the screw conveyor shaft (29) by a drive (30). The screw flighting is divided in half or nearly in half across the axis of rotation, with one side being right hand and the other being left hand. Thus when rotated in the proper direction, material is conveyed toward the center of the conveyor (22).

The pitch length of the right and left hand screw (22) is the same, and is one half of the outside diameter of the screw flighting. This pitch is uniform until the flighting extends approximately one pitch length underneath the trough shroud (24). At this point, the pitch length of the flighting abruptly changes to equal the outside diameter of the screw. This screw pitch is maintained until the flighting ends at or near the conveyor midpoint. By varying the pitch along the length of the conveyor (22), the feed material is effectively metered.

Located at the conveyor midpoint is a discharge opening (32) in the bottom of the conveyor trough (20). The opening (32) is approximately the same width as the outside diameter of the screw flights and is of sufficient length so approximately one half of the final pitch length of both the right and left hand screws is exposed to the opening.

Located generally beneath the opening (32) is a transition area (34) leading to the material inlet (46) of a rotary air valve (42). This transition area (34) is equipped with access doors (36) for inspection of the air valve/transition area (42/34), and to allow maintenance of the rotary air valve (42) without its removal. The doors (36) are equipped with safety interlock devices (38) which will stop the rotary air valve (42) and the screw conveyor (22) rotation any time either of these doors (36) is opened.

The rotary air valve (42) consists of a cylindrical, tubular housing (44) having a section of the cylinder wall of the housing (44) removed to serve as a material inlet (46). The material inlet (46) receives metered bulk material from the screw conveyor (22) and is approximately the same size as the discharge outlet (32) in the bottom of the conveyor trough (20). In general, the material inlet (46) is oriented so that it is located above the axial center-line of the cylindrical housing (44). Bordering along each of the two longitudinal sides of the material inlet (46), and parallel to the air valve rotor shaft (50), is a mounting shelf (114) containing an adjustable cutting knife (106) of approximately the same length as the material inlet (46). The knives (106) are oriented on the shelves (114) so the honed cutting edges (110), in general, oppose each other and face the material inlet (46) opening in the housing (44), extending into said opening (46) so the honed cutting edge (110) can be adjusted by the screws (112) on the shelf (114) to a minute distance within the inside diameter of the housing (44). The knives (106) are held in place by clamping bolts (113) threaded into the shelf (114).

Concentric with the axial center-line of the housing (44) is a rotor (40) comprised of a central shaft (50) with multiple vanes (52) forming a multiple of pockets (54), with each vane (52) extending outward from the shaft (50) center-line to within close proximity of the inside diameter of the cylindrical housing (44). When viewed from a radial direction, all vanes (52) are mounted at, but not limited to, a common angle which may vary between five and ten degrees as compared to the axial center-line of the shaft (50). The rotor (40) is powered by a motor bi-rotational (57) and drive (56). As the shaft (50) rotates, the vanes (52) move circumferentially below the material inlet (46) area, and in general toward the cutting edge (110) of one cutting knife (106) and away from the other cutting knife (106). As the outside edge of a vane (52) passes the cutting edge (110) of the knife (106) it is moving toward, a cutting force is created on any material trapped between the two. The cutting action is enhanced by the close proximity of the honed cutting edge (110) of the knife (106) to the edge of the rotor vanes (52). Furthermore, with the vanes (52) canted at an angle, the cutting action occurs gradually as the edge of each vane (52) passes the cutting edge (110) of the knife (106) in an incremental manner along their respective lengths. Having a knife (106) on both sides of the material inlet (46) allows this cutting action to occur whether the rotor (40) is turning in either a clockwise or counter-clockwise direction.

End plates (60) cover each end of the cylindrical housing (44) and contain bearings (62) on which the rotor (40) is supported and rotates. Each end plate (60) contains one opening to act as an air inlet (64) or an outlet (66), depending on the direction of air flow. These openings (64, 66) are located on the plates (60) radially between the inside diameter of the rotor vanes (52) and the inside diameter of the cylindrical housing (44). The air inlet (64) and outlet (66) openings, in general, are positioned below the axial center-line of the cylindrical housing (44), and in an offset manner defined by the vane (52) angle. Thus, as the vanes (52) rotate past the air inlet (64) and outlet (66), they do so in a simultaneous manner, that is, as the edge of a vane (52) end reaches the side of the air inlet (64) opening, it also reaches the same side of the air outlet (66) opening.

High pressure air is fed by a fan or blower (120) through the air inlet (64). Escape to the atmosphere of the pressurized air through the material inlet (46) is minimized by the close proximity of the outside diameter of the rotor vanes (52) to the inside diameter of the cylindrical housing (44). Thus, the high pressure air is channeled through each pocket (54) as the vanes (52) rotate past the air inlet (64) and outlet (66). To diminish air leakage which occurs between the end plates (60) and the ends of the rotor vanes (52), a seal plate (70) of antifriction material is placed at each end of the rotor (40). The seal plates (70) have roughly the same outside diameter as the inside diameter of the cylindrical housing (44). The seal plates (70) are also equipped with openings through the center of sufficient size to allow the rotor shaft (50) to extend through and openings of roughly the same shape, size, and location as the air inlet (64) and outlet (66). The seal plates (70) are held stationary with respect to the end plates (60) and the cylindrical housing (44), with the rotor (40) ends turning in contact with the inside surface of the seal plates (70). As the seal plates (70) wear, shims (72) between the rotor end plates (60) and the rotor housing (44) can be removed to bring the seal plates (70) back onto contact with the rotor (40).

Bulk material, such as bark mulch, is fed into the hopper (10) by means of, but not limited to a loader, a conveyor, or a live bottom or dump truck. Material either falls directly through the hopper (10) into the screw conveyor trough (20), or comes in contact with the diverter (12) and is influenced downwards to the trough (20) openings at the ends of the screw conveyor (22). As the material fills the trough (20), the screw (22) acts upon it, moving it from the outside ends of the trough (20) toward the converging point of the conveyor (22). If sufficient material is fed to the trough (20) openings to cover the screw flighting, the screw conveyor (22) will run full. The screw conveyor (22) ends run full until the material reaches the pitch length change under the shroud (24). With the increased volume between the flights, the material level drops to less than full on each side. The material from one end is conveyed until it is thrust upon material being conveyed from the other end. The reduced capacity of the full pitch converging screw flighting (22) and any open area between the converging screw flights allows enough area for the two converging masses to interact and induce forces upon each other to break one another apart. This is particularly advantageous when the feed material is fibrous and tends to move as large mass instead of moving as individual particles such as bark mulch.

The loose material falls, or is forced through the trough discharge opening (32) by the aforementioned converging action. The material falls through the transition area (34) into the material inlet (46).

As material falls into the rotary air valve (42), the rotating pockets (54) fill with material, usually in a random uneven fashion. With fibrous materials such as bark mulch, large pieces of material protruding out of a pocket (54) have a tendency to get jammed between the rotor housing (44) and the trailing vane (52) of that pocket as that vane (52) starts to pass from the material inlet (46) into the housing (44). The cutting knives (106) greatly reduce jamming by cutting any fibrous material extending beyond the outside diameter of the vanes (52), while the angled vane (52) reduces the cutting area so only a small portion of the knife (106) is cutting at any moment. The angled vane (52) also helps to more evenly distribute the material in the pockets (54) between the vanes (52) by allowing potential overage to spill to the next pocket (54), or axially down the pocket (54). If a large piece of material does jam the air valve (42), the rotation of the air valve rotor (40) automatically reverses allowing the material causing the jam to fall into the pocket (54) or to be cut by the other knife (106).

Material contained in the area defined by the pockets (54) and the housing (44) rotates around with the rotor (40) until the vane (52) ends come into communication with the air inlet (64) and outlet (66) ducts simultaneously. High pressure air from a blower (120) is passed into the pocket (54) where the pressurized air picks up the bulk material and conveys it out of the air valve (42) and into a discharge conduit (68) for distribution. The discharge conduit (68) may be fitted with a flexible hose (69) for remote distribution of the bulk material or may be directly connected to other conveying devices for transfer of bulk materials.

This device is suitable for permanent installation. Yet it has the added advantage of mobility and may be easily transported from place to place in order to achieve the desired movement of material.

It is intended that the foregoing be merely a description of the preferred embodiment and that the invention be limited solely by that which is within the scope of the appended claims.

We claim:

1. An apparatus for conveying and discharging bulk material comprising
   a hopper feeder assembly having a diverter dividing said hopper;
   a trough mounted generally below said hopper assembly;
   a converging screw conveyor mounted within said trough;
   a means for driving said screw conveyor;
   an opening in the bottom of said trough;
   a transition area located beneath said opening;
   a rotary air valve located beneath said transition area;
   a means for driving said rotary air valve;
   said rotary air valve having a material inlet, a central shaft with multiple vanes mounted at a five to ten degree angle to the axis of said shaft defining pockets between said vanes;
   at least one cutting means positioned on a mounting shelf along the longitudinal axis of said material inlet;

said rotary air valve having an air inlet and an air outlet, said outlet offset from said inlet by the angle of said vane so that air fed through said inlet is channeled through said pocket to said outlet;

a means for conveying bulk material from said outlet of said rotary valve;

and a means for supplying pressurized air to said air inlet.

2. An apparatus for conveying and discharging bulk material comprising a hopper feeder assembly having a diverter dividing said hopper into two halves, said diverter feeding material into said halves of said hopper;

a concave semi-circular trough mounted generally below and in communication with said halves of said hopper assembly;

a shroud extending approximately the length of said diverter centered over said trough;

a converging screw conveyor having variable pitch mounted within said trough;

a means for driving said screw conveyor;

an opening centrally positioned in the bottom of said trough;

a transition area located beneath said opening in said trough;

a rotary air valve located beneath said transition area;

a means for driving said rotary air valve;

said rotary air valve having a cylindrical housing with a material inlet, a central shaft with multiple vanes mounted at a five to ten degree angle to the axis of said shaft defining a pocket between two adjacent vanes;

at least one cutting means positioned on a mounting shelf along the longitudinal axis of said material inlet and parallel to the air valve rotor shaft;

said rotary air valve having an air inlet and an air outlet, said outlet offset from said inlet by the angle of said vane so that air fed through said inlet is channeled through said pocket to said outlet;

a means for supplying pressurized air to said air inlet;

and a means for conveying bulk material from said outlet of said rotary valve.

3. An apparatus for conveying and discharging bulk material according to claim 1 wherein said material inlet has at least two cutting means, opposing each other positioned on opposing sides of said material inlet.

4. An apparatus for conveying and discharging bulk material according to claim 3 wherein said rotary air valve is driven by a bi-rotational motor.

5. An apparatus for conveying and discharging bulk material according to claim 2 wherein said material inlet has at least two cutting means, opposing each other positioned on opposing sides of said material inlet.

6. An apparatus for conveying and discharging bulk material according to claim 5 wherein said rotary air valve is driven by a bi-rotational motor.

* * * * *